(12) United States Patent
Adelson et al.

(10) Patent No.: US 11,703,321 B2
(45) Date of Patent: Jul. 18, 2023

(54) RETROGRAPHIC SENSORS WITH COMPACT ILLUMINATION

(71) Applicant: Massachusetts Institute of Technology, Cambridge, MA (US)

(72) Inventors: Edward Adelson, Winchester, MA (US); Branden Romero, Brighton, MA (US); Filipe Fernandes Veiga, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 197 days.

(21) Appl. No.: 17/071,301

(22) Filed: Oct. 15, 2020

(65) Prior Publication Data
US 2021/0318116 A1 Oct. 14, 2021

Related U.S. Application Data

(60) Provisional application No. 62/915,064, filed on Oct. 15, 2019.

(51) Int. Cl.
*H04N 7/18* (2006.01)
*G01B 11/24* (2006.01)
*G01L 1/24* (2006.01)
*G06F 3/01* (2006.01)

(52) U.S. Cl.
CPC ............... *G01B 11/24* (2013.01); *G01L 1/24* (2013.01); *G06F 3/016* (2013.01)

(58) Field of Classification Search
None
See application file for complete search history.

(56) References Cited

U.S. PATENT DOCUMENTS

2009/0315989 A1\* 12/2009 Adelson .............. G06F 3/03547
348/135

\* cited by examiner

*Primary Examiner* — Carl Adams
(74) *Attorney, Agent, or Firm* — Wolf, Greenfield & Sacks, P.C.

(57) ABSTRACT

A retrographic sensor includes a transparent structure, a transparent elastomeric pad, and an at least partially reflective layer. One or more light sources emit light into a side surface of the transparent structure. The light undergoes internal reflection in the transparent structure and is reflected toward a camera oriented toward the transparent structure. The at least partially reflective layer may be semi-specular in some embodiments.

33 Claims, 10 Drawing Sheets

RETROGRAPHIC SENSORS WITH COMPACT ILLUMINATION

RELATED APPLICATIONS

This application claims the benefit under 35 U.S.C. § 119(e) of U.S. provisional application Ser. No. 62/915,064, filed Oct. 15, 2019, the disclosure of which is incorporated herein by reference in its entirety.

GOVERNMENT LICENSE RIGHTS

This invention was made with Government support under Grant No. N00014-18-1-2815 awarded by the Office of Naval Research. The Government has certain rights in the invention.

FIELD

Disclosed embodiments are related to reprographic sensors and related methods of use.

BACKGROUND

The sense of touch contributes to the dexterity of human manipulation, especially in cases where high precision is desirable. The complex ensemble of mechanoreceptors in the human hand provides extremely rich tactile sensory signals. These sensory signals encode information such as contact force and contact shape and such signals can be used to detect complex state transitions such as making or breaking contact or the occurrence of slippage between the finger and the grasped object.

Vision based tactile sensors have become employed with robotic systems due to their high signal resolutions and the softness of their sensing surfaces. The softness of the sensing surface allows for larger contact regions as it deforms to conform with the object surface. The resulting contact areas are then characterized in great detail via the high-resolution signals. Together, these properties have enabled the use of these sensors in tackling several tasks such as assessing grasp success, serving object surfaces, detecting slip and shear force, reconstructing three-dimensional surfaces, and distinguishing between different cloth materials. However, conventional sensors are constrained to flat or nearly flat designs.

SUMMARY

In some embodiments, a retrographic sensor includes a transparent shell including at least a portion having a curved interior surface and a curved exterior surface, a transparent elastomeric pad disposed on the curved exterior surface, and an at least partially reflective layer disposed on the transparent elastomeric pad such that the transparent elastomeric pad is disposed between the at least partially reflective layer and the transparent shell. The retrographic sensor also includes one or more light sources configured to emit light into the transparent shell.

In some embodiments, a retrographic sensor includes a transparent structure, a transparent elastomeric pad disposed on the transparent structure, a semi-specular layer disposed on the transparent elastomeric pad such that the transparent elastomeric pad is disposed between the semi-specular layer and the transparent structure, and one or more light sources configured to emit light into the transparent structure.

In some embodiments, a retrographic sensor includes a transparent structure, a transparent elastomeric pad disposed on the transparent structure, a matte layer disposed on the transparent elastomeric pad such that the transparent elastomeric pad is disposed between the matte layer and the transparent structure, one or more light sources configured to emit light into the transparent structure, and a filter positioned between the one or more light sources and the transparent structure.

In some embodiments, a retrographic sensor includes a transparent structure including an interior surface and an exterior surface, a transparent elastomeric pad disposed on the exterior surface of the transparent structure, an at least partially reflective layer disposed on the transparent elastomeric pad such that the transparent elastomeric pad is disposed between the at least partially reflective layer and the transparent structure, and one or more light sources configured to emit light into the transparent structure, where light from the one or more light sources is configured to be repeatedly reflected between the at least partially reflective layer and the interior surface.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
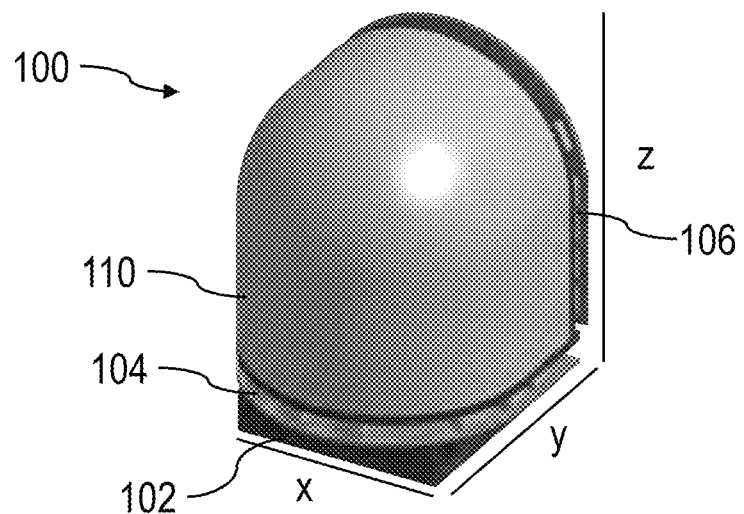
FIG. 1A is a perspective view of one embodiment of a robotic finger including a retrographic sensor.

Conventional vision based tactile sensors, including retrographic sensors, provide high resolution signals which allow an object or surface in contact with the tactile sensor to be characterized in detail. However, conventional vision based tactile sensors are often constrained to flat or nearly flat designs. This flat geometry is a result of difficulties associated with providing well controlled directional lighting in non-planar geometries. Accordingly, conventional retrographic sensors are bulky and not able to be packaged for use in smaller robotic systems. Additionally, the flat geometry of conventional vision based tactile sensors limits the applicability of a vision based tactile sensor for robotic systems which may employ non-flat contact fingers. For example, some robotic systems may employ round contact systems. Accordingly, geometry restrictions associated with conventional vision based tactile sensors have prevented the widespread use of high-fidelity conventional retrographic sensors. While there are dexterous manipulators equipped with other types of tactile sensors, such sensors are too rigid and/or do not provide sufficiently detailed information for reliable dexterous manipulation.

In view of the above, the inventors have recognized the benefits of a retrographic sensor which allows for curved contact surfaces in a wide variety of geometries through the use of light piping. In some conventional retrographic sensors that employ a membrane made of a matte material disposed on transparent elastomeric pad and structure, illumination of the elastomeric pad and structure may fall off rapidly as a function of distance from the light source. Light that strikes the matte membrane will be reflected in all directions, and much of it will escape through a top surface of the transparent structure. Therefore, there is little possibility of having the light from one or more light sources repeatedly reflect internally of the elastomeric pad and structure when a matte membrane is employed. Accordingly, the inventors have recognized the specific benefits of a retrographic sensor that employs an at least partially reflective layer to promote light piping and internal reflection throughout the retrographic sensor, as will be described further below. The retrographic sensor allows for a robotic finger to be miniaturized relative to conventional retrographic systems, while still providing a high-fidelity characterization of an object or surface in contact with the robotic finger. Additionally, the retrographic sensor retains a high-resolution and compliance for dexterous manipulators.

In some embodiments, a retrographic sensor for a curved robotic finger includes an imaging device and a transparent assembly viewed by the imaging device. The assembly may include a transparent structure (e.g., shell), a transparent elastomeric pad, and an at least partially reflective layer disposed on the elastomeric pad. The transparent structure may include at least a portion having a curved interior surface and a curved exterior surface. In some embodiments, the transparent structure may be semi-spherical, quarter-spherical, formed as any portion of a sphere or cylinder, or formed as another curved structure (such as an S-shaped structure), though other curved shapes are also contemplated. The elastomeric pad may be attached to the transparent structure along the curved exterior surface such that the elastomeric pad forms a curved shape corresponding to the shape of the transparent structure. The at least partially reflective layer is disposed on the elastomeric pad, such that the elastomeric pad is disposed between the at least partially reflective layer and the transparent structure. The at least partially reflective layer may define a contact surface for a robotic finger that is configured to contact an object. One or more light sources are configured to emit light into the transparent structure, the reflections of which may be observed by the imaging device.

In some embodiments, the assembly of a retrographic sensor may effectively function as a light pipe such that the elastomeric pad is uniformly lit from one or more light sources. In one embodiment, one or more light sources may be positioned at one or more side surfaces of the transparent structure, where the one or more side surfaces of the transparent structure extend between an interior surface (e.g., curved interior surface) and an exterior surface (e.g., curved exterior surface) of the structure. The one or more light sources may emit light into the transparent structure from this position proximate the side surfaces of the structure, such that at least a portion of the emitted light undergoes internal reflection inside of the transparent structure and elastomeric pad, reflecting off of the at least partially reflective layer and an air boundary adjacent the interior surface of the structure. This arrangement allows the light emitted to uniformly spread throughout the elastomeric pad, as the light is effectively light piped through the structure assembly. When an object or surface contacts the at least partially reflective layer, the elastomeric pad may deform, thereby changing a reflective angle of the light in that area in a manner that may be detected by the imaging device. Accordingly, the characteristics of the object or surface may be determined by the change in the light in the assembly as observed by the imaging device. The imaging device may be positioned to view the transparent structure side of the assembly. That is, the imaging device may be oriented toward an internal surface of the transparent structure opposite the elastomeric pad.

In some cases, the uniformity of the light distribution within the sensor as well as the resolution of the sensor may be at least partially dependent on the reflective characteristics of an at least partially reflective layer included in a retrographic sensor assembly. That is, the inventors have recognized that the illumination of an elastomeric pad and the ability for an imaging device to detect changes in light reflection are in some ways at odds with one another. For example, use of a matte material which effectively scatters incident light in the at least partially reflective layer may result in an elastomeric pad with non-uniform lighting, with portions of the pad nearest the light sources being more brightly illuminated than portion further away from the light sources. Accordingly, the ability to detect objects or surfaces in the less illuminated areas is diminished or eliminated in such instances. As a contrasting example, use of a mirrored material in the at least partially reflective layer where light is reflected at the angle of incidence on the layer may result in difficulty detecting changes in the elastomeric pad, as any light reflecting as a result of deformation may be concentrated at a specific angle which may miss an imaging device. Thus, the inventors have recognized the benefits of an at least partially reflective layer that is specular, as such a layer may improve both the uniformity of illumination and sensitivity of a sensor in some embodiments.

As noted above, the inventors have recognized the benefits of employing a layer disposed on an elastomeric pad that is specular (i.e., mirror-like) compared to a layer that is matte. The at least partially reflective membrane or coating may allow light to continue reflecting repeatedly between an interior surface of a structure and the specular surface. That is, a specular membrane or coating combined with the internal reflection of light incident on the interior surface of a rigid structure may allow the directional illumination to continue over long distances through the sensor. However, as also noted above, in some instances, a specular membrane may have some disadvantages for use in retrographic sensing. For example, when an object presses against the membrane, it changes the local surface normal which causes light to be reflected out of the structure where it is visible to the camera. According to this example, the appearance of the membrane is that it is largely dark with occasional intensely bright highlights. These highlights occur at points where the angle between the illuminating light and the membrane surface normal happens to send strong light toward the camera. But for other nearby angles, this does not occur, and so the membrane appears dark. The result is that, rather than seeing a smoothly shaded image, as may be desirable for sensing a shape from shading or photometric stereo, the camera sees a sparse image of a few highlights against a very dark background.

In view of the above, the inventors have recognized that the sparseness of a captured image may be reduced and the smoothness of the shading image may be increased in some embodiments if a semi-specular membrane or coating is used instead of a specular one. A semi-specular membrane may be specular, in that an angle of incidence is similar to an angle of reflection, but the reflection has a wide specular lobe. The peak of the specular lobe will have an angle equal to that of an angle of incidence. For example, semi-specular materials may appear like blurry mirrors, similar to the appearance of sandblasted metal or metal flake paint. In some embodiments, a semi-specular membrane, coating, or other appropriate type of layer may be made using specular flakes such as small flakes of metal, mica, or other pigment particles that are flat and provide specular reflection from their flat sides. In a semi-specular membrane including metal flakes, the flakes may have a distribution of orientations and they may not be perfectly flat relative to a surface of an elastomeric pad on which they are disposed. Thus, there is a tendency for light to be reflected in the specular direction, but there is also a great deal of random variation about that direction. The result is that the semi-specular membrane reflectance has a broad specular lobe where the reflection angle is distributed around the expected reflection angle for a purely specular reflectance. While a semi-specular membrane according to exemplary embodiments described herein may employ a coating or membrane including specular flakes, any suitable material or coating may be employed to form a semi-specular layer, as the present disclosure is not so limited.

In view of the foregoing, in some embodiments, an at least partially reflective layer used with the embodiments of retrographic sensors described herein may be a semi-specular material with respect to light supplied by one or more light sources (e.g., visual light in a wavelength between 380 to 700 nm). In some embodiments, an at least partially reflective layer such as a semi-specular layer may have a reflectance under light from the one or more light sources greater than or equal to 50%, 60%, 75%, 80%, 90% and/or any other suitable percentage. Correspondingly, the at least partially reflective layer may have a reflectance under light from the one or more light sources less than or equal to 100%, 95%, 90%, 75%, 60%, and/or any other suitable percentage. Combinations of these values are contemplated, including an at least partially reflective layer having a reflectance under light from the one or more light sources between 50% and 95%, between 60% and 80%, or between 75% and 100%. Of course, an at least partially reflective layer such as a semi-specular material may have any suitable reflectance under light from the one or more light sources, including a reflectance less than those noted above, as the present disclosure is not so limited.

According to exemplary embodiments described herein, there is a tradeoff that determines a preferable kind of semi-specular reflection for a retrographic sensor. If the specular lobe of a semi-specular layer is too broad, then the light piping effect is poor since a great deal of light is reflected out through the top of a transparent structure each time there is a reflection off of the semi-specular layer. If the specular lobe of the semi-specular layer is too narrow, then the light piping effect is good, but the image seen by the camera may consist of sparse highlights. According to exemplary embodiments described herein, a width of the specular lobe of a semi-specular layer depends on the type of pigment flakes that are embedded in the membrane, and the range of angles over which these flakes are aligned. The range of angles of the flakes depends on the manner in which the membrane was constructed. In some embodiments, the semi-specular layer is made from an elastomeric paint consisting of a binder, a solvent, and a pigment. After the liquid paint is applied, by such processes as brushing, spraying, dipping, etc., the solvent evaporates and the membrane thickness reduces. During this process, the pigment flakes may become increasingly aligned with each other. By adjusting the choice of materials and the method of application, the width of the specular lobe may be adjusted.

As noted previously, in some embodiments a semi-specular material may also have a specular lobe suitable for promoting internal reflection of light emitted into a transparent structure (e.g., shell) and elastomeric pad. That is, the specular lobe of the semi-specular layer may be configured such that light emitted from one or more light sources (e.g., visual light in a wavelength between 380 to 700 nm) is reflected at suitably shallow angles to promote uniform illumination of an associated elastomeric pad by a light piping effect. In some embodiments, a semi-specular layer of a retrographic sensor may have a specular lobe with a width less than or equal to 90 degrees, 75 degrees, 60 degrees, 50 degrees, 40 degrees, 30 degrees, 15 degrees, and/or another other appropriate angle when reflecting light emitted from a point light source. The width of the specular lobe may be measured as the full angle at which the intensity has fallen by ½ from its peak on either side of the lobe. For example, a specular lobe width of 10 degrees would mean that the intensity falls by ½ at an angle +5 degrees or −5 degrees from the peak of the specular lobe. Corresponding to the above, a specular lobe of the semi-specular layer may have a width greater than or equal to 2 degrees, 6 degrees, 10 degrees, 15 degrees, 20 degrees, 25 degrees, 30 degrees, and/or any other appropriate width when reflecting light emitted from a point light source. In some embodiments, the semi-specular layer employed in a sensor may have a specular lobe with a width between 6 degrees and 50 degrees, 6 degrees and 40 degrees, 15 degrees and 40 degrees, 10 and 30 degrees, and/or any other suitable angular width greater than or less than the ranges noted above when reflecting light emitted from a point light source.

In some embodiments, a retrographic sensor may employ a plurality of light sources disposed along a side surface of a transparent structure (e.g., shell), where the side surface extends between an interior surface and an exterior surface of the transparent structure. The arrangement of the lights, including density, distance from the transparent structure, and position relative to the transparent structure, may affect light uniformity through an optically coupled elastomeric pad. Accordingly, the inventors have recognized the benefits of an elongated array of lights disposed proximate to and optically coupled with a transparent structure. The lights may be disposed uniformly along and oriented towards an associated side surface of the transparent structure, such that light is piped through the transparent structure uniformly. In some embodiments, the lights may be configured as LEDs such as surface mounted device LEDs or chip-on-board LEDs. Of course, any appropriate light source may be employed, as the present disclosure is not so limited.

In some cases, it may be desirable to increase the perceptibility of deformations of an elastomeric pad as perceived by an imaging device. In some embodiments, an imaging device may include one or more color channels configured to perceive different wavelengths of light. To utilize these separate channels in some imaging devices, in some embodiments a retrographic sensor may employ at least two different light sources emitting at least two different wavelengths of light positioned along multiple separate side surfaces of a transparent structure (e.g., a shell) disposed at different angles relative to one another. While exemplary embodiments described herein refer to singular wavelengths, it should be appreciated that in other embodiments singular wavelengths may correspond to a band of wavelengths, as the present disclosure is not so limited. For example, light of a first wavelength may be emitted into the transparent structure in a first direction using a first plurality of lights positioned on a first side of the transparent structure, while light of a second wavelength is emitted into the transparent structure in a second different direction using a second plurality of lights positioned on a second side of the transparent structure. The at least two different wavelengths of light maybe perceived by an imaging device configured to perceive the first wavelength and second wavelength of light on separate channels. Such an arrangement may allow for more precision in characterizing a surface or object in contact with a reflective layer. For example, when an object presses against a semi-specular layer, the surface normal changes, which causes changes in the intensities of reflected light observed by the imaging device. Since the different colors of illumination come from different directions, this provides enough information to perform photometric stereo and thereby estimate the 3D shape of the displacement of membrane.

In some embodiments, light of three different wavelengths, may be emitted into the transparent structure along three different side surfaces of the transparent structure. For example, a first wavelength of light emitted into the transparent structure may be between 635 nm and 700 nm (corresponding to the color red), a second wavelength of light emitted into the transparent structure may be between 560 nm and 520 nm (corresponding to the color green), and a third wavelength of light emitted into the transparent structure may be between 490 and 450 nm (corresponding to the color blue). Of course, one or more light sources may emit any suitable wavelength(s) of light into a transparent structure of a retrographic sensor at any suitable angle, as the present disclosure is not so limited. For example, in some embodiments, one or more light sources may emit electromagnetic radiation in any appropriate range of wavelengths, including ultraviolet, near-infrared, infrared, etc. Correspondingly, an imaging device of a retrographic sensor may be configured to receive and detect electromagnetic radiation emitted from the one or more light sources, where that electromagnetic radiation has any appropriate range of wavelengths. Accordingly, while exemplary embodiments described herein employ visual light in a range of 380 nm to 700 nm, any suitable wavelength of electromagnetic radiation may be employed, as the present disclosure is not so limited In some embodiments, the relative geometry of an elastomeric pad and transparent structure (e.g., a shell) may affect the uniformity and sensitivity of a retrographic sensor to deformation of the elastomeric pad. In particular, a combined thickness of transparent materials in a sensor assembly of a retrographic sensor (e.g., a thickness of the transparent structure plus a thickness of the elastomeric pad may be most effective when tuned for a radius of curvature of an exterior surface of the elastomeric pad located opposite an underlying shell or other supporting structure. In some embodiments, the combined thickness of the transparent materials in the sensor assembly may be greater than or equal to 3%, 4%, 7%, 10%, 15%, and/or any other suitable percentage of a radius of curvature of the exterior surface. Correspondingly, the combined thickness of the transparent materials in the sensor assembly may be less than or equal to 25%, 20%, 15%, 12% 10%, and/or any of suitable percentage of its radius of curvature. Combinations of the above noted values are contemplated, including, but not limited to, thicknesses of the transparent materials in the sensor assembly between 3% and 25% of its radius of curvature, 4% and 20% of its radius of curvature, 7% and 15% of its radius of curvature, as well as 4% and 10% of its radius of curvature. Of course, the transparent materials in a sensor assembly may have any suitable thickness, as the present disclosure is not so limited.

While embodiments described herein include a structure (e.g., a shell) having a semi-spherical or quarter-spherical shape, any suitable curved shape may be employed for a retrographic sensor, as the present disclosure is not so limited. For example, cylindrical and ellipsoidal shapes for a structure may also be employed. The structure may form an overall shape matching the retrographic sensor. That is, in some embodiments, the elastomeric pad and an at least partially reflective layer may have a shape matching that of the underlying structure.

Having described various parameters and relationships for retrographic sensors including a semi-specular reflective layer, several specific embodiments implementing these concepts are presented below.

In some embodiments, a retrographic sensor includes an imaging device, a clear (i.e., transparent) rigid structure, a transparent elastomeric pad, a semi-specular reflective layer, and one or more light sources illuminating the reflective layer, the light sources having an elongated shape running parallel to the upper edge of the elastomeric pad. In some embodiments, the specular lobe of the semi-specular layer is between 6 degrees and 40 degrees wide to promote a light piping effect within the elastomeric pad. In some embodiments, the width of the clear rigid structure is more than six times its thickness. In some embodiments, the rigid structure is curved in one or two dimensions. In some embodiments, the rigid structure is a section of cylinder, a sphere, an ellipsoid, or other simple rounded shape. In some embodiments, the structure is in the approximate shape of a human finger. In some embodiments, the light sources consist of multiple SMD LEDs. In some embodiments, the light sources consist of chip-on-board LEDs. In some embodiments, the light sources are of multiple wavelengths and are placed along different side surfaces of the rigid structure to provide illumination in different directions.

In some embodiments, a retrographic sensor has a rounded shape similar to a finger, and includes a camera, one or more light sources, and a hollow transparent structure (e.g., shell), the structure being composed of some combination of cylindrical, spherical, or ellipsoidal regions, and the structure comprising a clear rigid structure covered partly or fully by an elastomeric pad, the pad being coated with a reflective layer. In some embodiments, the reflective layer is semi-specular. In some embodiments, the semi-specular membrane has a specular lobe between 6 degrees and 40 degrees in subtense. In some embodiments, the light emitted from the one or more light sources is transported through the hollow transparent structure by a light piping effect with multiple reflections. In some embodiments, the one or more light sources emit two or more wavelengths of light at different positions along the structure, so as to provide shaded images with different directions of shading.

In some embodiments, a retrographic sensor includes an imaging device looking toward a tilted mirror within a tubular structure, the structure being illuminated at its edges by one or more light sources, the structure being composed a rigid clear tubular structure such as a cylindrical tube, the tubular structure being partly or fully covered with an elastomeric pad, the pad being covered by an at least partially reflective layer. In some embodiments, the at least partially reflective layer is semi-specular. In some embodiments, the semi-specular reflective layer has a specular lobe width between 6 degrees and 40 degrees in subtense. In some embodiments, the light from the one or more light sources is transported through the tubular structure and the elastomeric pad by a light piping effect with multiple reflections. In some embodiments, the one or more light sources emit two or more wavelengths (e.g., colors) of light at different positions along the tubular structure, so as to provide shaded images with different directions of shading. In some embodiments, the tubular structure may be formed in a partial tubular shape, such as a semi-cylinder rather than a cylinder. Of course, the tubular structure may have any suitable shape, as the present disclosure is not so limited.

The above embodiments are discussed in reference to light piping within a retrographic sensor. However, in retrographic sensors that do not employ light piping, it is preferable that the light incident on a membrane be similar across the whole area of the membrane, meaning that the illumination should be fairly uniform in intensity and in direction. In conventional retrographic sensors, the illumination may be much brighter near the light source than it is further away, due to the inverse square falloff of light intensity from a single light source. Conventional techniques to address this lack of uniformity have resulted in bulky retrographic sensors not appropriate for small, compact manipulators. Accordingly, the inventors have recognized the benefits of a retrographic sensor employing a matte membrane while having compact illumination in an overall compact shape. In some embodiments, a retrographic sensor may include a transparent structure arranged as a flat block (e.g., a rectangular prism). Of course, a transparent structure may have any suitable shape, as the present disclosure is not so limited. The retrographic sensor may also include a transparent elastomeric pad in optical contact with the transparent structure, and a matte layer disposed on the elastomeric pad. The matte layer is disposed on the elastomeric pad, such that the elastomeric pad is disposed between the matte layer and the transparent structure, where together the structure, pad, and matte layer form a sensor assembly. The matte layer may define a contact surface for a robotic manipulator that is configured to contact an object. The retrographic sensor may include one or more light sources that are configured to emit light into the transparent structure, the reflections of which may be observed by an imaging device.

In some embodiments, a retrographic sensor may include a matte layer with a reflectance suitable to help reduce the occurrence of multiple reflections of incident light from one or more light sources (e.g., visual light in a wavelength between 380 to 700 nm) within the sensor. In such an embodiment, the matte layer may have a reflectance under light from the one or more light sources greater than or equal to 6%, 8%, 10%, 15%, 20%, 25%, and/or any other suitable percentage. Correspondingly, the matte layer may have a reflectance under light from the one or more light sources less than or equal to 35%, 30%, 25%, 20%, 15%, 10%, and/or any other suitable percentage. Combinations of these values are contemplated, such as a reflectance under light from the one or more light sources between 6% and 35%, 8% and 30%, 10% and 25%, as well as 15% and 30%. Of course, a matte material with any suitable reflectance under light from one or more light sources may be employed, as the present disclosure is not so limited.

In some embodiments where a matte layer is employed, to aid in the coupling and uniformity of the light input into a transparent shell or other transparent structure, the lights may be positioned adjacent the transparent structure at a distance from the elastomeric pad which less than or equal to two times a thickness of the elastomeric pad, where the distance is measured in a direction of the thickness of the elastomeric pad. Such an arrangement may improve the illumination of the outer edges of the associated elastomeric pad. In some embodiments, an elongated array of LEDs may have a width at least three times larger than a height of the elongated array. Such an arrangement may promote even light distribution throughout an associated elastomeric pad.

In addition to the above, the inventors have also recognized the benefits of a retrographic sensor employing filters and diffusers disposed between a light source and a transparent structure or elastomeric pad. The arrangement of a retrographic sensor including filters and/or diffusers positioned between a light source and transparent structure improves the uniformity of light received by an imaging device. Furthermore, in some embodiments, such an arrangement allows an elastomeric pad to have a non-flat shape, such as a curved or domed shape. For example, in some embodiments, the transparent structure may be shaped as a rectangular block (e.g. a rectangular prism), while the elastomeric pad may have a domed or otherwise curved two-dimensional or three-dimensional shape. Furthermore, by providing filters in optical contact with a transparent structure and/or an elastomeric pad, light that would otherwise reflect off of side surfaces of the transparent structure and disrupt an image received by the imaging device is absorbed by the filters.

In some embodiments, a retrographic sensor includes an imaging device, a transparent rigid structure, a transparent elastomeric pad, and a matte layer. The matte layer may be disposed on the elastomeric pad, which is disposed on the rigid structure, such that the elastomeric layer is positioned between the matte layer and the rigid structure. A light source may be disposed along a side surface of the rigid structure to emit light into the rigid structure in a direction transverse to a thickness of the rigid structure.

In some conventional retrographic sensors, when the light from a light source enters the transparent structure, it may be refracted at a vertical face of the side surface of the transparent structure. Even though this side surface may be flat, the refraction induces a form of lensing on the light due to the angles at which the side surface is struck. As a result, the range of angles of light within the transparent structure may be limited. This means it may be difficult for the light to illuminate the parts of the matte layer that are closest to the side surfaces of the transparent rigid structure nearest the light source. These poorly illuminated portions of the matte layer cannot be used for tactile sensing.

In view of the above, in some embodiments a retrographic sensor may include a diffuser disposed on a side surface of a transparent rigid structure in optical contact with the rigid structure (e.g., the diffuser may be joined to the rigid structure with an optical adhesive). The diffuser may randomize the directions of the light rays emitted into the rigid structure, thereby improving the illumination of the elastomeric pad nearest the side surface. The diffuser being in optical contact with the transparent structure also avoids a lensing effect that occurs when there is an air gap between the diffuser and transparent structure. The lensing effect is caused by refraction of light rays passing from the diffuser into the air gap and then into to the transparent structure. In some embodiments, a diffuser may also be employed in a similar manner with a retrographic sensor employing light-piping and a semi-specular membrane as described above.

In some embodiments, a diffuser employed with a retrographic sensor may be a clear material filled with diffusing particles. For example, the diffusing particles may be the pigment titanium dioxide in some embodiments. The diffuser can alternatively be a clear material with a textured surface (for example a "ground glass" surface), which introduces random or regular refractions at multiple directions to the rays that impinge upon it. Of course, any suitable diffuser arrangement may be employed, as the present disclosure is not so limited.

In some cases, conventional retrographic sensors are arranged such that light enters a transparent structure and strikes an opposite side surface of the structure, where some significant portion of the light would reflect back into the structure as nuisance illumination. To address this nuisance illumination, in some embodiments the retrographic sensor may also include a filter which at least partially absorbs incident light. Furthermore, in some embodiments a retrographic sensor may include multiple filters disposed on opposing side surfaces of a transparent structure, and arrangement which may reduce the amount of nuisance illumination that interferes with a desired shaded image. With filters disposed on opposing side surfaces of the transparent structure, the filters attenuate reflected rays more so than direct illumination from a light source. That is, any reflected nuisance illumination will be attenuated thrice by filters, once on first entry to the transparent structure through a first filter, once when the light exits the structure into a second filter on an opposite side of the structure, and once when the light reflects from an air interface adjacent the second filter on an opposite side of the structure. In contrast, direct light from a light source passes through a filter only once. In this manner, nuisance illumination in the retrographic sensor may be reduced. The filter may be preferably disposed between and in optical contact with a diffuser and a transparent rigid structure. The filter may also be disposed between a diffuser and a light source. In either case, the filter may be in direct or indirect optical contact with the transparent rigid structure. When the filter is in indirect optical contact, one or more intermediary components (e.g., a diffuser) may be positioned between the filter and the structure while there is no air gap between the filter and the transparent rigid structure. Further, in some embodiments, there is no air gap between the filter and the transparent rigid structure.

In some embodiments a filter employed with a retrographic sensor may be a neutral density (ND) filter. In other embodiments, a filter employed with a retrographic sensor may be a colored filter configured to absorb wavelengths of light other than particular wavelength or wavelength band of light. In such an arrangement, light sources may emit two or more wavelengths of light from different sides of a transparent structure, as will be discussed further with reference to other embodiments. Accordingly, in some embodiments, multiple filters of different colors may be employed corresponding to wavelengths emitted by the light sources. For example, a first light source emitting a blue wavelength of light may be adjacent a blue colored filter on a first side of the transparent structure, while a second light source emitting a red wavelength of light may be adjacent a red filter on a second side (e.g., opposite side) of the transparent structure. The blue filter may absorb a significant portion of the red wavelength of light that would reflect as nuisance illumination, and likewise the red filter may absorb a significant portion the blue wavelength of light that would reflect as nuisance illumination. Of course, any suitable filter arrangement may be employed including any number of filters of different colors or of the same color, as the present disclosure is not so limited.

In some embodiments, a filter employed in a retrographic sensor disposed between one or more light sources and a transparent structure may be configured to absorb at least a portion of the light from the one or more light sources. Accordingly, the effects of light reflecting off one or more side surfaces of the transparent structure may be reduced, as the filter may attenuate the light each time the light from the one or more light sources passes through the filter. In some embodiments, a filter may be configured to absorb greater than or equal to 50%, 60%, 70%, 80%, 85% and/or any other suitable percentage of light emitted from the one or more light sources. Correspondingly, a filter may be configured to absorb less than or equal to 99%, 90%, 80%, 70%, 60%, 50%, 40%, and/or any other suitable percentage of light emitted from the one or more light sources. Combinations of the above-noted ranged are contemplated, including percentages of absorption of light from one or more light sources between 50% and 80%, 60% and 80%, as well as 50% and 60%. In some embodiments, a filter may preferably absorb between 60% and 80% of light emitted from the one or more light sources. Of course, a filter may absorb any suitable percentage of light from the one or more light sources, as the present disclosure is not so limited. It should be noted that any suitable percentage of light may be absorbed by the filter and an absorption percentage may be at least partly based on the power of a light source. For example, power of a light source may be configured to emit light with sufficient intensity such that filters absorbing 99% or more of the light from the light source may still be employed.

In some embodiments, the light source may be arranged as an elongated array of lights, approximating a strip light along a side surface of the rigid layer. Such an arrangement may improve uniformity of illumination in the elastomeric pad, as the intensity of light falls more closely to linearly with distance as a finite line, rather than the square of distance as is the case with a point light source. Put alternatively, the rate at which the intensity of the light falls from a light source approximating a finite line is between quadratic and linear. According to exemplary embodiments described herein, an elongated light array may have a width measured along a maximum dimension at least three times greater than a height of the array.

In some embodiments, an elastomeric pad may be configured as a portion of a cylinder, a portion of a sphere, or another suitable curved two-dimensional or three-dimensional shape. That is, an elastomeric pad may be optically joined to a flat (e.g., rectangular) rigid layer along a flat surface, and may provide a curved surface for contacting an object or surface. The radius of curvature of the elastomeric pad may be between 0.75 times and four times a width of the rigid layer. Such an arrangement may promote uniform illumination of the elastomeric pad.

In some embodiments, a retrographic sensor includes an imaging device, a clear (i.e., transparent) rigid structure, a clear elastomeric pad, a matte layer, and one or more light sources illuminating the matte layer. The light sources may have an elongated shape running parallel to the top edge of the elastomeric pad, where the height of the lowest point on the strip above the pad is no greater than two times a thickness of the pad. In some embodiments, the width to height ratio of the clear rigid structure is between 2 and 6. In some embodiments, the retrographic sensor includes a filter placed between the light source and the structure, the filter absorbing at least 50% of light emitted from the one or more light sources, and the filter being in optical contact with the structure. In some embodiments, the retrographic sensor includes a diffuser placed between the light source and the structure, the diffuser being in optical contact with the structure. In some embodiments, the retrographic sensor includes a filter placed in optical contact with the structure and a diffuser is placed in optical contact with the filter, the filter absorbing at least 50% of light from the one or more light sources, and the filter and diffuser are placed between the structure and the light source. In some embodiments, the light source is a set of surface mounted device LEDs. In some embodiments, the light source is a chip-on-board LED. In some embodiments, the width to height ratio of the elongated light source is at least 3. In some embodiments, the elastomeric pad is domed with a radius between 0.75 times and 4 times the width of the rigid structure. In some embodiments, a radius of curvature of the elastomeric pad may be between 1 and 2 times the width of the rigid structure. In some embodiments, light arrays that emit different wavelengths, or colors, of light are used to illuminate different side surfaces of the structure.

In some cases, it may be desirable to increase the perceptibility of deformations of an elastomeric pad employed with a matte layer as perceived by an imaging device. In some embodiments, an imaging device may include one or more color channels configured to perceive different wavelengths of light, similar to other embodiments discussed previously. To utilize these separate channels in some imaging devices, in some embodiments a retrographic sensor may employ at least two different light sources emitting at least two different wavelengths of light positioned along multiple separate side surfaces of a transparent structure (e.g., a block) disposed at different angles relative to one another. While exemplary embodiments described herein refer to singular wavelengths, it should be appreciated that in other embodiments singular wavelengths may correspond to a band of wavelengths, as the present disclosure is not so limited. For example, light of a first wavelength may be emitted into the transparent structure in a first direction using a first plurality of lights positioned on a first side of the transparent structure, while light of a second wavelength is emitted into the transparent structure in a second different direction using a second plurality of lights positioned on a second side of the transparent structure. The at least two different wavelengths of light maybe perceived by an imaging device configured to perceive the first wavelength and second wavelength of light on separate channels. Such an arrangement may allow for more precision in characterizing a surface or object in contact with a matte layer.

According to exemplary embodiments of the sensors including semi-specular reflective or matte layers described herein, a retrographic sensor may include an imaging device. The imaging device may be a camera or other appropriate type of photosensitive detector directed towards a transparent structure (e.g., a block, a shell, etc.). For example, in one embodiment, an imaging device may include separate imaging channels capable of separately detecting different wavelengths of light. In one such embodiment, the imaging device may be a red green blue (RGB) camera or any other suitable camera suitable for receiving reflected light from a transparent structure. The imaging device may pass a signal corresponding to an image of the sensor assembly to a processor for processing. The processor may be configured to execute computer readable instructions stored in volatile or non-volatile memory. In some instances, and as described further below, the processor may use the signal to determine information about an object or surface in contact with the sensor which may then be used for controlling a robotic system, such as a robotic manipulator, associated with the sensor.

According to exemplary embodiments described herein, a semi-specular layer or matte layer may be formed by any suitable method. In one embodiment, the layer may be formed as a membrane and joined to an elastomeric pad with an optical adhesive. In another embodiment the layer may be painted or coated on an elastomeric pad. Of course, other arrangements are contemplated, and the present disclosure is not so limited in this regard.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1A is a perspective view of one embodiment of a robotic finger including a curved retrographic sensor 100 employing light piping. The retrographic sensor 100 of FIG. 1A is configured to provide a uniform illumination pattern along the entire surface of the finger. To promote such uniformity, the retrographic sensor of FIG. 1A employs light piping. That is, in the retrographic sensor of FIG. 1A, light inside of a retrographic sensor medium is at least partially constrained within the medium by internal reflection. According to some embodiments as shown in FIG. 1A, this internal reflection is accomplished by using a semi-specular layer 110 that functions as a sensing surface, an elastomeric pad, and a thin transparent shell, as will be discussed further with reference to the exploded view of FIG. 1B. The semi-specular layer only slightly diffuses light in contrast to some lambertian (e.g., matte) surfaces used in conventional retrographic sensors that completely diffuse the light. Accordingly, light incident on a semi-specular layer will keep its directionality and thus more uniformly illuminate the surfaces of the retrographic sensor when compared to a matte layer light dissipating light as the light travels through the sensor. As shown in FIG. 1A, the semi-specular layer 110 is curved. In such an embodiment, a semi-specular layer may allow light to more uniformly illuminate all portions of the curved surface when compared to a matte layer where light is dissipated. The transparent shell may keep at least some of the light from escaping into the interior of the sensor via internal reflection unless contact is made between the semi-specular layer and an object. That is, as will be discussed further below, deformation of the semi-specular layer may reflect light out of the interior of the sensor to be received by an imaging device.

As shown in FIG. 1A, the robotic finger is formed with at least a portion of a sensor assembly having a rounded shape. The sensor assembly may be formed by the semi-specular layer 110, an elastomeric pad, and a rigid transparent shell, as described further with reference to FIG. 1B. The retrographic sensor includes LED arrays 104, 106, arranged adjacent the side surfaces of the transparent shell. The retrographic sensor also includes a housing 102 which supports the LED arrays 104, 106 as well as the sensor assembly. The LED arrays form elongated curved strips, with individual LEDs arranged along a curve. According to the embodiment of FIG. 1A, the strip-shaped LEDs are curved rather than straight to follow a curved side surface of the transparent shell. In some embodiments, the LED arrays 104, 106 may be configured to emit three different wavelengths of light. For example, in some embodiments, the LED arrays may be configured to emit three different wavelengths of light, which may correspond to visual colors such as red, green, and blue. The retrographic sensor 100 also includes an imaging device (e.g., an RGB camera) with a wide-angle lens (see FIG. 1B) positioned in an interior of the sensor, oriented toward the sensor assembly. That is the imaging device may be oriented toward an interior surface of the transparent shell, so that the imaging device may receive light reflected from the semi-specular layer 110. In the embodiment of FIG. 1A, the semi-specular layer is configured as a semi-specular layer. When an object presses against the semi-specular layer to deform the semi-specular layer, the surface normal changes, causing changes in the intensities of reflected light observed by the imaging device (for example, see FIGS. 2A-2B). In embodiments where multiple colors of light are emitted by the LED arrays 104, 106 and originate from different directions, the reflected light provides enough information to perform photometric stereo analysis and thereby estimate the three-dimensional shape of the displacement of the semi-specular layer (and correspondingly, the deformation of an elastomeric pad underlying the semi-specular layer).

According to the embodiment of FIG. 1A, the retrographic sensor 100 may be relatively compact and applicable to a wide range of robotic manipulators. In some embodiments, the robotic finger of FIG. 1A may have a width of about 28 mm (x=28 mm), a thickness of about 30.5 mm (y=30.5 mm), and height of about 35.6 mm (z=35.6 mm). Of course, in other embodiments any suitable dimensions may be employed for a robotic finger and/or retrographic sensor, including dimensions greater than or less than those noted above, as the present disclosure is not so limited.

Figure 1B:
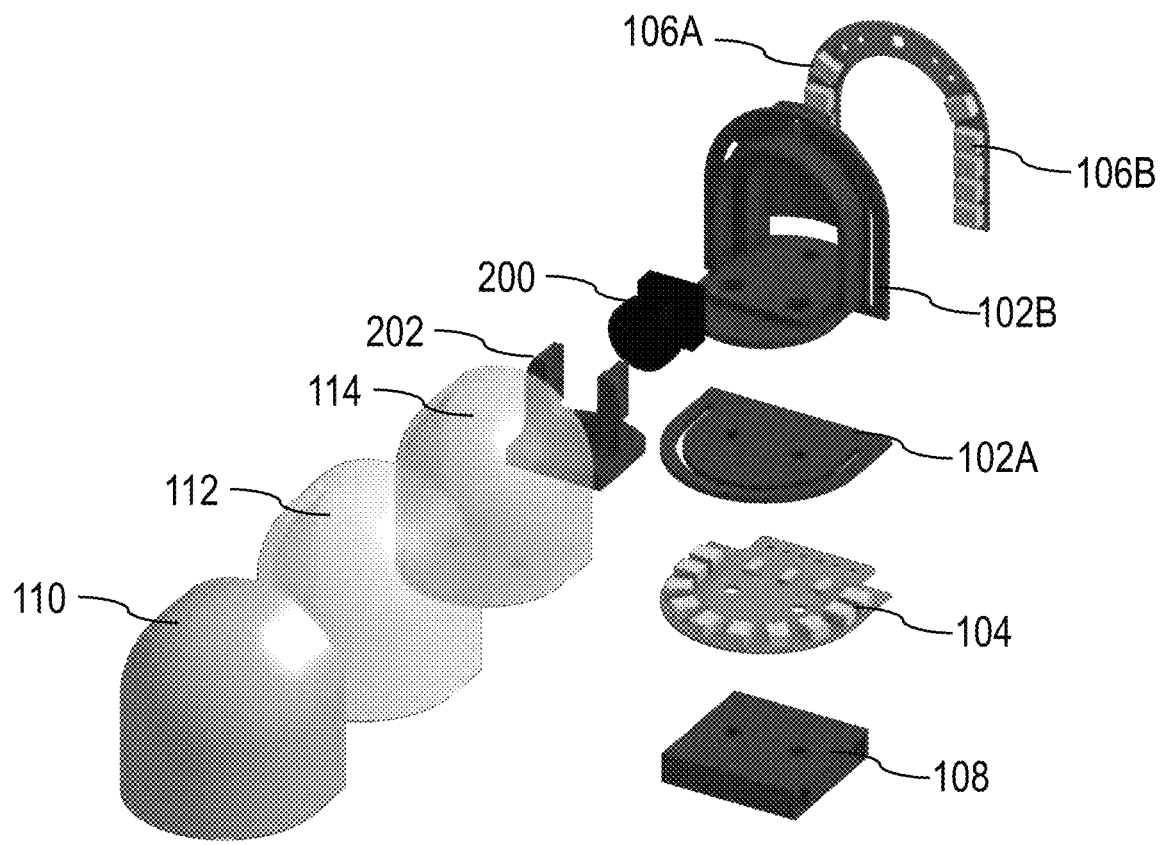
FIG. 1B is an exploded view of the robotic finger of FIG. 1A.

FIG. 1B is an exploded view of the robotic finger of FIG. 1A showing the various components of the robotic finger with integrated retrographic sensor 100. The retrographic sensor 100 includes a rigid transparent shell 114, surrounded by a transparent elastomeric pad 112. The elastomeric pad 112 is disposed on a curved exterior surface of the transparent rigid shell 114. The rigid shell may be composed of acrylic, epoxy, plastic, or any other suitable transparent material. The elastomeric pad may be composed of silicone, rubber, thermoplastic elastomer, polyurethane, or another suitably compliant and partially or substantially transparent material. The elastomeric pad may be coated with the semi-specular layer 110. As discussed previously, the transparent rigid shell, elastomeric pad, and semi-specular layer may form a sensor assembly, and may be in continuous optical contact with one another, meaning that no air gap between the layers is present.

As shown in FIG. 1B, the LEDs arrays 104, 106A, 106B are arranged in curved strips and are configured to emit light into associated side surfaces of the transparent shell. The side surfaces of the transparent shell extend between an interior surface and exterior surface of the transparent shell, where the elastomeric pad is optically coupled to the exterior surface of the transparent shell. In particular, as shown in FIG. 1B, the LED arrays are arranged in a first strip array 104, a second strip array 106A, and a third strip array 106B. In the embodiment of FIG. 1B, each of the LED arrays 104, 106A, 106B is configured to emit a different wavelength of light into the transparent shell 114 to provide visible shading from different directions. That is, the first strip array 104 emits lights into the transparent shell 114 from a first direction, the second strip array 106A emits light into the transparent sell from a second direction, and the third strip array 106B emits light into the transparent shell from a third direction. The first direction, second direction, and third direction are each a different circumferential direction relative to the shell 114. Accordingly, the light from each of the strip arrays are configured to intersect across the entire area of the shell 114. As a result, deformation of the semi-specular layer may cause the different wavelengths of light to reflect differently in a manner that may captured by the imaging device.

As shown in FIG. 1B, the retrographic sensor 100 includes an imaging device 200 disposed inside of the transparent shell 114. The imaging device 200 is held by a mount 202 and is oriented towards a curved interior surface of the transparent shell, such that the imaging device receives reflected light from the LEDs arrays 104, 106A, 106B as discussed previously. The imaging device may be configured as a camera such as a red green blue (RGB) camera. Of course, any suitable imaging device may be employed, as the present disclosure is not so limited.

According to the embodiment of FIG. 1B, the various components of the retrographic sensor 100 are held together with a first housing portion 102A and a second housing portion 102B. The sensor assembly including the transparent shell 114 may be mounted between the first housing portion 102A and the second housing portion 102B. The mount 202 may be coupled to the first housing portion 102A. The first LED array 104 may be mounted to the first housing portion 102A, while the second LED array 106A and third LED array 106B are configured to be mounted to the second housing portion. The various components of the retrographic sensor 100 may be mounted to the housing with any suitable fasteners, including mechanical fasteners (e.g., screws, bolts, rivets, etc.) and adhesives (e.g., epoxy, glue), as the present disclosure is not so limited. According to the embodiment of FIG. 1B, the retrographic sensor 100 may be mounted to a robotic manipulator (e.g., a robotic hand, robotic arm, etc.) with a mounting plate 108. In other embodiments, the retrographic sensor 100 may be mounted to a robotic manipulator using any suitable arrangement, as the present disclosure is not so limited.

It should be noted that while in the embodiment of FIGS. 1A-1B the retrographic sensor is integrated into a robotic finger, in other embodiments a retrographic sensor may be employed in any suitable application where it may be desirable to measure the deformation of a contact surface.

Accordingly, the retrographic sensors according to exemplary embodiments described herein are not limited to integrations within robotic fingers.

Figures 2A, 2B:
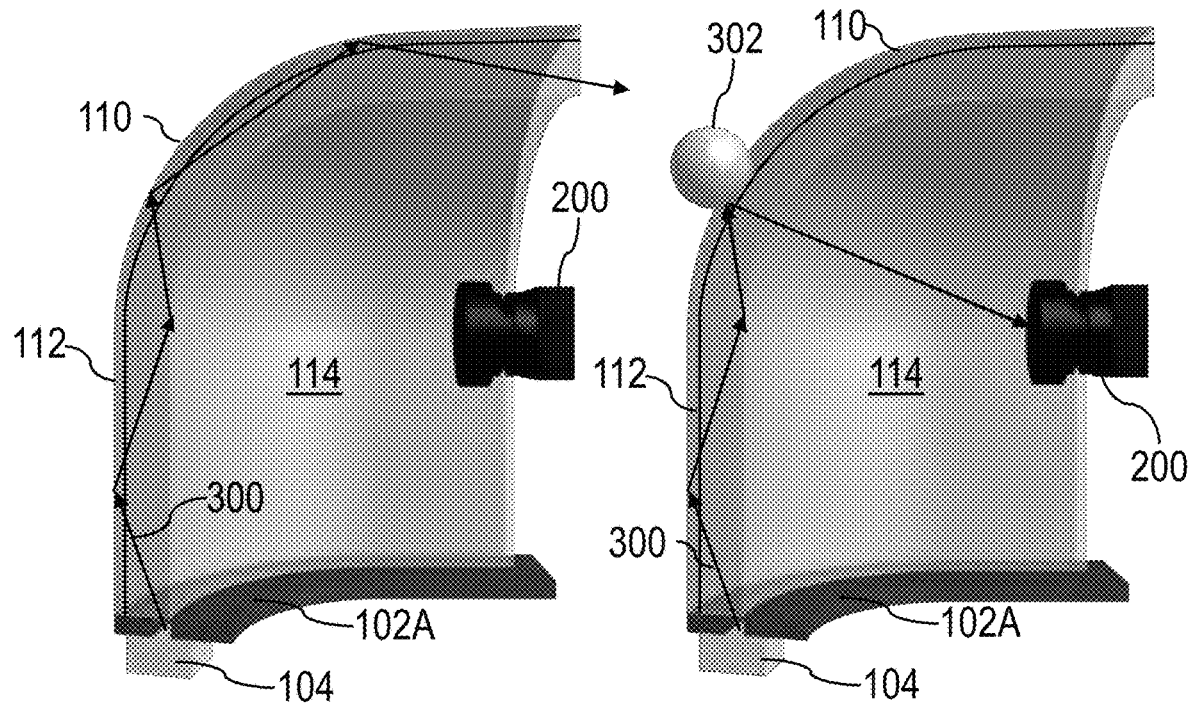
FIG. 2A is a schematic of light piping in the retrographic sensor of FIG. 1A in a first condition.
FIG. 2B is a schematic of light piping in the retrographic sensor of FIG. 1A in a second condition.

FIGS. 2A-2B are schematics of light piping in the retrographic sensor of FIG. 1A in a first condition and second condition, respectively. In some embodiments, as shown in FIGS. 2A-2B, the semi-specular layer 110 may be made of a semi-specular material. Due to the semi-specular nature of the layer 110, the reflections from incident light on the semi-specular layer will cause a light piping effect when the transparent shell 114 is illuminated from a side surface of the shell. As shown in FIGS. 2A-2B, rays of light 300 that strike an interior surface of the transparent shell 114 will encounter an air interface and will tend to be reflected back into the shell toward the elastomeric pad 112, continuing in a similar circumferential direction through the curved shell. Rays of light 300 that strike the semi-specular layer 110 are reflected semi-specularly. Semi-specular reflection causes most of the incident rays to be specularly reflected forward towards the shell 114. However, the semi-specular nature of the layer 110 causes some of the light to be reflected in a variety of directions due to random local variations within the semi-specular layer. Due to these random local variations within the semi-specular layer, some of the light may reflect at an angle that causes the light to escape through the interior surface of the transparent shell, and these rays will be visible to the imaging device 200. Still, the majority of the reflected rays will continue moving away from the light source in the same general circumferential direction. Accordingly, the semi-specular layer 110 allows the entirety of the shell 114 and the elastomeric pad 112 to be evenly illuminated as viewed by the imaging device 200. As will be discussed further with reference to FIG. 2B, the semi-specular layer 110 also allows deformation of the layer and the elastomeric pad 112 to be perceived by the imaging device 200.

In FIG. 2B, a small spherical object 302 is pressed against the semi-specular layer 110 and compresses the elastomeric pad 112 to illustrate the effects that will be visible to the imaging device 200 when an object 302 contacts the semi-specular layer. As the object has deformed the semi-specular layer 110, the surface normal of the semi-specular layer changes based on the surface profile of the object. The amount of light reflected from the overall surface of the semi-specular layer toward the imaging device 200 varies across the surface depending on the surface normal at a particular point on the surface. As the embodiment of FIG. 2B employs a semi-specular layer 110, the image perceived by the imaging device 200 will show a strong shading effect, being brighter on one side or the other depending on the direction of light. The shading will be smoothly graded, which improves the ability to use shape from shading methods in computer vision to extract geometric information about the semi-specular layer 110.

It should be noted that the inventors have recognized a tradeoff that determines the suitable range of a specular lobe for semi-specular reflection. If the specular lobe is too broad, then the light piping effect shown in FIGS. 2A-2B is poor since a significant portion of light is reflected out through the interior surface of the transparent shell 114 each time there is a reflection. If the specular lobe is too narrow, then the light piping effect is good, but the image perceived by the imaging device 200 may consist of sparse highlights as not enough light may be scattered each time there is a reflection. In some embodiments, the width of the specular lobe of a semi-specular layer is based at least partly on the type of pigment flakes that are embedded in the membrane, and the range of angles over which these flakes are aligned. The range of angles may at least partly depend on the way the semi-specular layer was constructed. In some embodiments, a semi-specular layer may be made from an elastomeric paint consisting of a binder, a solvent, and a pigment. After the liquid paint is applied, by such processes as brushing, spraying, dipping, etc., the solvent evaporates, and the membrane thickness reduces. During this evaporation process, the pigment flakes become increasingly aligned with each other. By adjusting the choice of materials and the method of application, it is possible to adjust the width of the specular lobe. However, other types of semi-specular layers and different methods of applying the semi-specular layers may also be employed in a retrographic sensor according to exemplary embodiments described herein, as the present disclosure is not so limited. In some embodiments, the specular lobe of the semi-specular layer has a width in angular subtense between 6 degrees and 40 degrees. (i.e., ±3 degrees or ±20 degrees about a major direction of the specular lobe).

Figure 3:
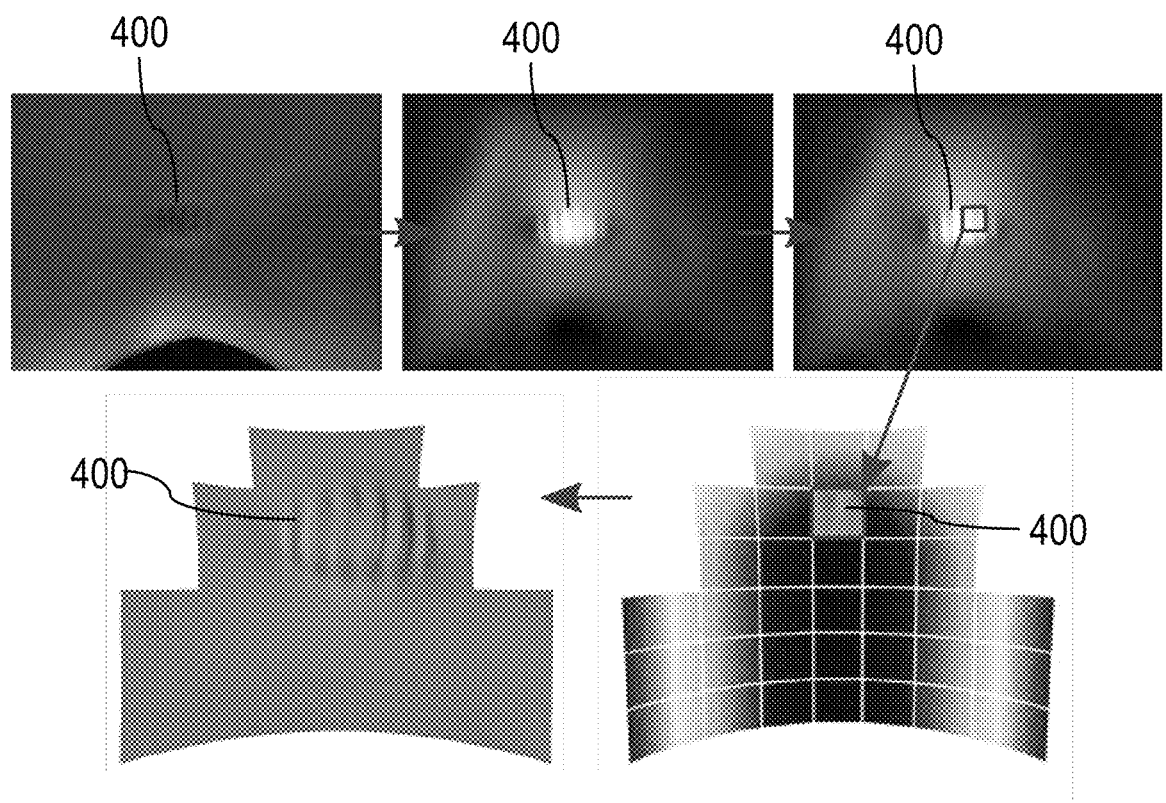
FIG. 3 depicts one embodiment of image processing for the retrographic sensor of FIG. 1A.

FIG. 3 depicts one embodiment of image processing for the retrographic sensor of FIG. 1A for detecting and characterizing an object in contact with the retrographic sensor. In particular, shading 400 caused by compression of an elastomeric pad and deformation of a semi-specular layer is used to characterize the object. To begin, the three-dimensional geometry of the sensing surface (e.g., the surface of the semi-specular layer) was computed using a processor executing instructions stored in volatile or non-volatile memory. The surface was broken into a set of quads and the vertices of those quads was retrieved. Next, the retrographic sensor was calibrated to discover where these vertices lay in image space. In one embodiment, a CNC rig may be employed in which the retrographic sensor was rigidly attached in a known location. A probe with a 4 mm diameter sphere attached to it was used to contact the sensor at the calculated vertices. On each contact, a picture was taken of the sensing surface from the sensors camera and the processor performed a Hough Circle Transform to find the centroid of the sphere in image space. That point was then added to a table with its corresponding location in the surfaces three-dimensional space. Once all vertices had been probed the reference point cloud was constructed. For each quad, the corresponding image patch was taken and the perspective transform was calculated, since the image was taken from a perspective view. The image patch was then warped and its resolution retrieved. Back in the surfaces space a linearly spaced grid was created in the quad with the same resolution as the image patch and projected onto the surface geometry. Now when a height map image was received during reconstruction each image patch was taken, warped, and then the depth of the corresponding points was changed based-off the depth at each pixel.

To transform the red green blue (RGB) information to a gradient, a look-up table was constructed mapping each RGB value to a gradient for each image patch determined in the previous section. To construct the gradient, the fingertip was contacted in each quad several times at varying locations. For each poke into the semi-specular layer, the centroid and radius of the poke in image space was calculated, again using Hough Circle Transform. Since the geometry of the probe was known each pixel intensity may be mapped to a gradient. For each quad, the average pixel intensity of all the pokes in that region was taken and mapped to the gradient. For RGB values not in the look-up table, a gradient was assigned by linearly interpolating the gradients mapped to the nearest RGB values.

Figure 4:
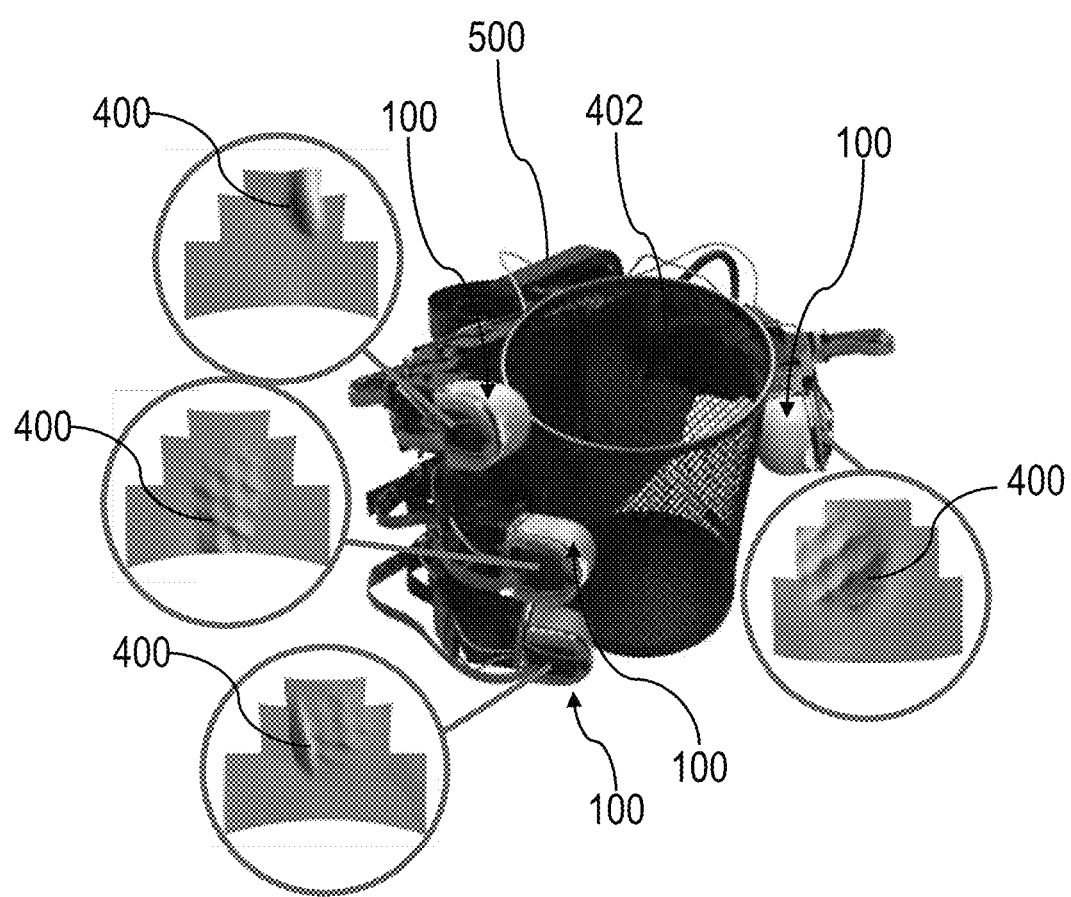
FIG. 4 depicts one embodiment of a robotic hand including a plurality of the robotic fingers of FIG. 1A.

FIG. 4 depicts one embodiment of a robotic hand 500 including a plurality of the robotic fingers of FIG. 1A, each including a retrographic sensor. As shown in FIG. 4, the robotic hand is grasping an object 402. Each of the fingers provides information suitable to generate a gradient based on light shading 400 caused by deformation of semi-specular layer and elastomeric pad. As shown in FIG. 4, the gradient may allow textural and structural details of the object 402 to be discerned.

Figure 5:
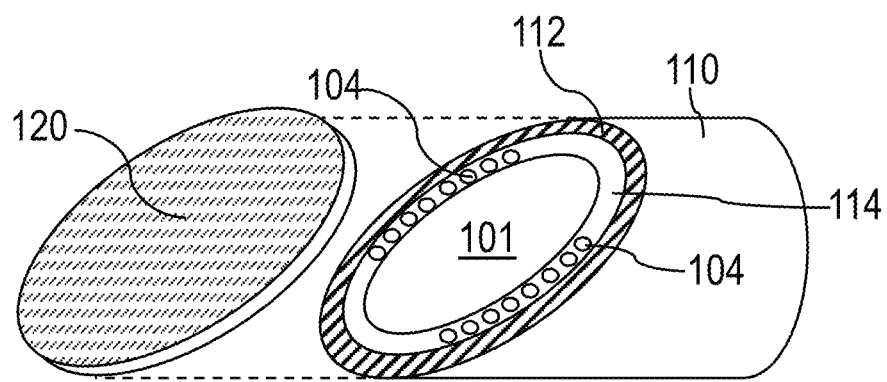
FIG. 5 is a schematic of another embodiment of a retrographic sensor.

FIG. 5 is a schematic of yet another embodiment of a retrographic sensor. In some cases, it may be desirable to have a tubular robotic finger with a beveled end. Such embodiments may be appropriate when inserting the finger into granular material. In some embodiments, the tubular robotic finger may be cylindrical in shape or formed as a portion of a cylinder. In other embodiments, a tubular robotic finger's cross section may be a rounded rectangle or other non-circular shape. According to the embodiment of FIG. 5, the retrographic sensor includes a hollow cylindrical shell 114 that may be made of clear acrylic or another transparent material. The cylindrical tube is surrounded with a cylindrical elastomeric pad 112, which in turn is coated with semi-specular layer 110. The cylinder is cut at an angle at a distal end of the cylinder, producing an elliptical section. LED arrays 104 may emit light of different wavelengths, send light into the cylinder, and illuminate the cylindrical shell and elastomeric pad directionally via light piping as discussed previously with reference to other embodiments. An elliptical mirror, 120 is placed at the distal end of the cylinder. According to this embodiment, an imaging device is oriented down a bore 101 of the cylindrical shell 114. The imaging device receives the image reflected from the mirror 120, which shows the interior of the membrane. In some embodiments, a third array of LEDs may be employed which emit a third color, providing light piped illumination from a third direction. While in the embodiment of FIG. 5 the cylindrical shell 114 is closed to form a complete annulus, in other embodiments a shell may be open on one or more sides, providing a C-shaped shell, a U-shaped shell, or other shapes, as the present disclosure is not so limited.

While FIGS. 1A-5 discuss embodiments related to retrographic sensors that employ light piping through the use of a semi-specular layer, the embodiments of FIGS. 6-13 relate to embodiments of a retrographic sensor employing a matte layer. Accordingly, the techniques and arrangements discussed with reference to the embodiments of FIGS. 6-13 may be employed in compact retrographic sensor arranged as a flat block. Of course, the techniques discussed may be applied to any suitable retrographic sensor having any desired shape, as the present disclosure is not so limited.

Figure 6:
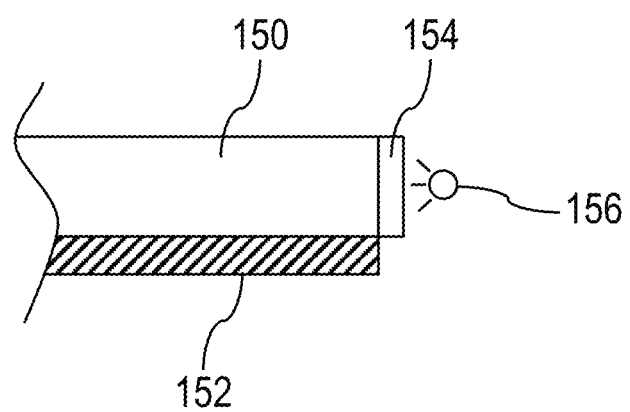
FIG. 6 is a schematic of yet another embodiment of a retrographic sensor.

FIG. 6 is a schematic of another embodiment of a retrographic sensor. As shown in FIG. 6, a transparent structure 150 and elastomeric pad 152 were optically joined to form a sensor assembly. According to the embodiment, of FIG. 6, a diffuser 154 was brought into optical contact with the transparent structure 150 along a side surface of the transparent structure. In one embodiment, the diffuser was glued to the structure 150 with an optical adhesive that is roughly index matched to both the diffuser and the structure. In this case, the rays passing through the diffuser from a light source 156 enter the structure directly, without going through an air gap, and therefore avoid experiencing a lensing effect that may limit their range of angles. As the lensing effect is avoided, portions of the elastomeric pad 152 nearest the side surfaces may be better illuminated than if the diffuser was not present or separated from the structure 150 by an air gap. In some embodiments, the diffuser can be a clear material filled with diffusing particles, for example, the pigment titanium dioxide. In other embodiments, the diffuser may be a clear material with a textured surface (for example a "ground glass" surface), which introduces random or regular refractions at multiple directions to the rays that impinge upon it. In some embodiments, the light source 156 and diffuser 154 may be integrated, as the present disclosure is not so limited.

Figure 7:
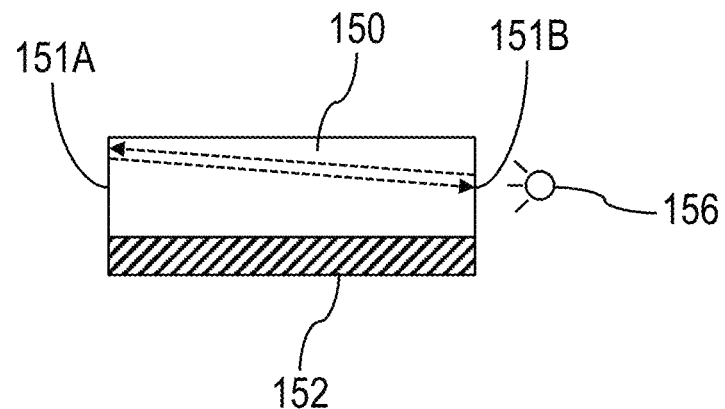
FIG. 7 is a schematic of yet another embodiment of a retrographic sensor.

FIG. 7 is a schematic of yet another embodiment of a retrographic sensor with a rigid transparent structure 150 and an elastomeric pad 152 illuminated by a light source 156. The arrangement shown in FIG. 7 is conventional and presents issues with nuisance illumination. That is, light that enters through side surface 151B will travel in various directions through the structure and the gel pad, and some of it will strike the opposite side surface 151A. There, the light encounters an air interface, which will reflect some significant portion of light back into the structure 150, where it will act as nuisance illumination that interferes with the desired shaded image.

Figure 8:
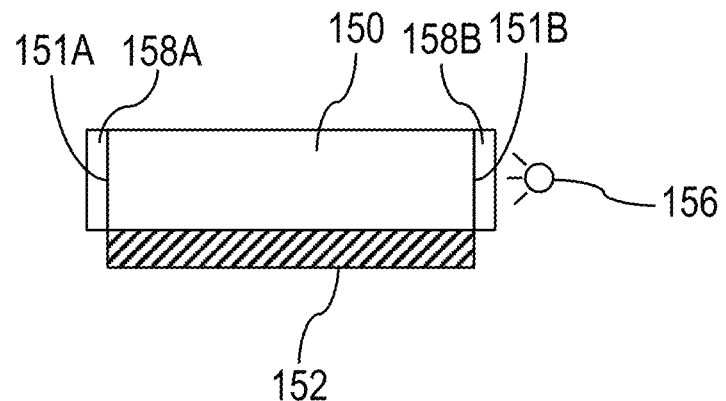
FIG. 8 is a schematic of yet another embodiment of a retrographic sensor.

In view of the challenges associated with FIG. 7, the inventors have recognized the benefit of the retrographic sensor shown in FIG. 8. As shown in FIG. 8, filters, 158A, 158B are placed in optical contact with the side surfaces 151A, 151B of the structure 150. In some embodiments, these filters may be a neutral density (ND) filter, or a colored filter. When light strikes the side surface 151A from within the structure 150, it travels into the filter 158A, where some portion of it is absorbed. In some embodiments, the material of the filter is index matched to that of the structure, such that there is little to no reflection at the interface. In some embodiments, an ND filter may be employed that absorbs 50% or more of the light and transmits 50% or less of the light. In this embodiment, 50% or less of light incident on the ND filter from inside of the structure 150 will continue through the ND filter and will strike the air interface on the outer side of the ND filter. At this point some of the light will be reflected inward back towards the structure, but this reflected light will again be attenuated by the ND filter before it returns to the inside of the structure. Thus, the reflected light passes through the filter twice, whereas the direct light (e.g., light from the light source 156) passes through a filter only once. Thus, the ND filter will reduce the amount of light that bounces around inside of the structure and will accordingly reduce nuisance illumination, thereby improving the sensitivity of the sensor.

In some embodiments, if the light source 156 includes multiple light sources with different wavelengths, then the filters 158A, 158B may also have different absorbance properties at different wavelengths (e.g., color filters for the different color light sources). For example, if a red filter is employed on one side, but a different filter color (e.g., blue) is provided on the opposite side of the structure, direct light from a light source emitting light corresponding to the color of the first filter may pass through the first filter into the structure unabsorbed while the same light incident on the second filter from inside of the structure may be substantially absorbed. For example, a red LED passes relatively untouched through a red filter on the way in, but when it encounters a blue filter on the other side the red light is absorbed. This use of colored filters may lead to a more efficient system, in that intensity of the input lights is not being attenuated while passing into the structure 150.

According to the embodiment of FIG. 8, the filters 158A, 158B are in optical contact with the structure 150. If the filters are not in optical contact with the structure, the resulting air gap between the filter and the structure may cause reflection at the air interface, such that the filters are not able to attenuate the reflected light.

Figure 9:
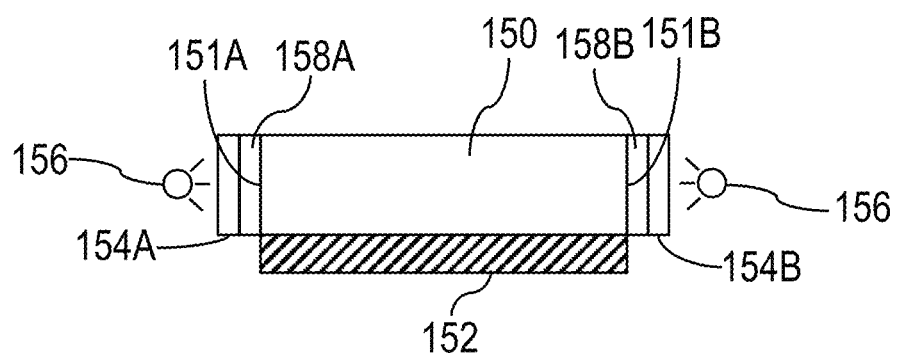
FIG. 9 is a schematic of yet another embodiment of a retrographic sensor.

FIG. 9 is a schematic of yet another embodiment of a retrographic sensor employing both diffusers 154A, 154B and filters 158A, 158B, in series. In the depicted embodiments, the diffusers 154A, 154B are disposed on and in optical contact with an exterior surface of the corresponding filters 158A, 158B which are disposed on and in optical contact with the corresponding side surfaces 151A, 151B. As shown in FIG. 9, light sources 156 shine through the diffusers, through the filters, and into the structure 150. There is optical contact between these layers so there is no air gap which may cause internal reflection in any layer. Once inside of the structure, the light may illuminate an elastomeric pad 152 disposed on a surface of the structure extending between the two depicted side surfaces of the structure. The arrangement shown in FIG. 9 may have the benefits of both embodiments described with reference to FIGS. 6 and 8. Namely, the arrangement reduces nuisance illumination from internal reflections back toward an originating light source and may also improve illumination of the elastomeric pad nearest the side surfaces of the structure 150.

Figure 10:
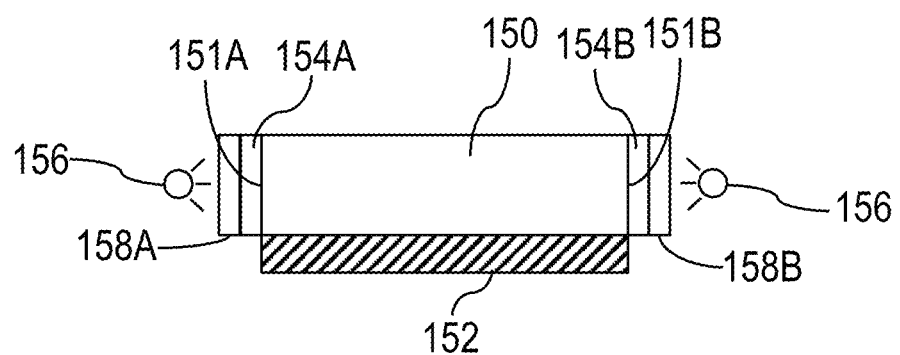
FIG. 10 is a schematic of yet another embodiment of a retrographic sensor.

FIG. 10 is a schematic of yet another embodiment of a retrographic sensor. Similar to the embodiment of FIG. 9, the sensor includes diffusers 154A, 154B, and filters 158A, 158B disposed adjacent side surfaces 151A, 151B of a transparent structure 150. However, in this embodiment, the diffusers 154A, 154B are between and in optical contact with the side surfaces 151A, 151B and filters 158A, 158B. In this case, light sources 156 shine through filters and the light then passes through diffusers before entering the structure 150. As a result of this arrangement, the light from within the structure will strike the diffuser before it strikes the filter, and the diffuser will reflect some light back into the structure. Accordingly, the effectiveness of the filters may be diminished relative to the embodiment of FIG. 9. Nevertheless, the arrangement of FIG. 10 may still be somewhat effective in illuminating the elastomeric pad 152 nearest the side surfaces and attenuating nuisance reflections back toward an originating light source.

Figure 11:
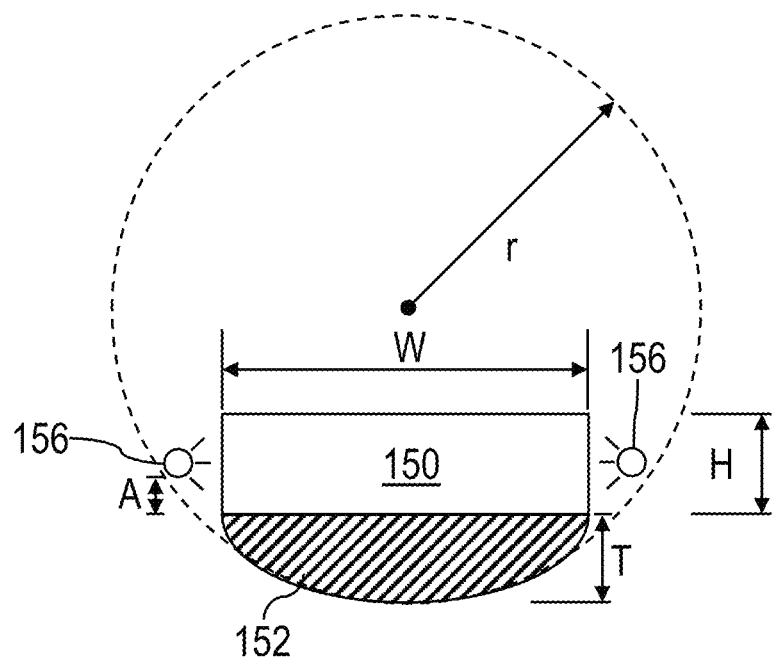
FIG. 11 is a schematic of yet another embodiment of a retrographic sensor.

FIG. 11 is a schematic of yet another embodiment of a retrographic sensor, showing a domed elastomeric pad 152. As noted previously, in some cases it may be desirable for the elastomeric pad to be domed. For example, for a robot finger, it is useful to have a domed finger rather than a flat finger because a flat finger is most effective when parallel to an object's surface, whereas a domed finger can be slightly misaligned and still make good contact. Additionally, according to the embodiment of FIG. 11 the domed sensor can improve the uniformity of the illumination. That is, the rays striking a matte layer are more nearly uniform in angle of incidence than they are in the case of a flat pad. In addition, the concavity of the elastomeric pad surface, as seen from within, increases the illuminance on the far parts of the membrane and decreases it on the near parts, which compensates for the inverse square law that would normally lead to a drop in intensity with distance. However, if the doming is too extreme, then the uniformity of illumination and direction may decrease. In addition, for many points the light is not striking the membrane at a grazing angle, and therefore may not create a good shaded image. For this reason, the dome curvature may be limited to a desired range to provide suitable illumination.

According to the embodiment shown in FIG. 11, the amount of doming can be expressed in terms of the radius of the circle that produces the domed shape. If the width of the structure in a direction along an interface between the pad and structure is W, then a radius of curvature, r, of an exterior surface of the elastomeric pad of between 0.75 times and 4 times the width, W may give good illumination. This relationship may be applicable to pads with sections that are at least partially cylindrical or spherical and can also be used to guide the proper curvature of pads that are not exactly cylindrical or spherical.

Another aspect of the geometry of domed retrographic sensors that may be considered is the ratio between the structure height, H, in a direction perpendicular to an interface between the pad and structure and the structure width, W, in a direction parallel to an interface between the pad and structure, see FIG. 11. If the structure 150 is too thin, then there is little room for the light to spread through the structure to illuminate the other side (via direct and reflected light). If it is too thick, then the reflecting surface of the top (i.e., interior) surface of the structure is too distant to provide the second path of reflected light. In view of these considerations, the ratio of W/H is preferably between 3 and 6 in order to optimize the combination of direct and internal reflection lighting striking the outer (i.e., bottom) surface of the elastomeric pad.

Yet another aspect of the geometry for a sensor is the distance of the light sources 156 from the interface between the structure 150 and the elastomeric pad 152. To achieve appropriate edge illumination of the elastomeric pad nearest the light sources 156, the lights are preferably not too distant from the interface such that the angle of the light from the light to the edges of the elastomeric pad are not too great. Preferably, the distance, A, between the light and the interface between the structure 150 and elastomeric pad 152 measured in a height direction of the structure 150 in a direction perpendicular to an interface between the pad and elastomeric pad 152 is not more than two times the thickness, T, of the elastomeric pad.

Figure 12:
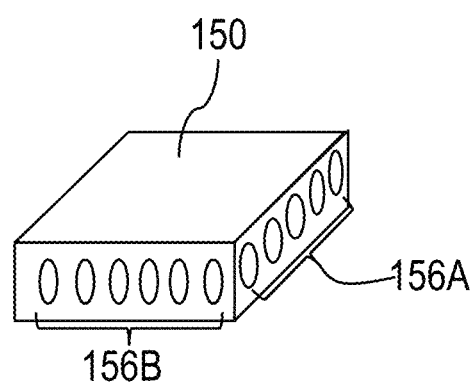
FIG. 12 is a schematic of yet another embodiment of a retrographic sensor.

FIG. 12 is a schematic of yet another embodiment of a retrographic sensor showing the three-dimensional shape of a transparent structure 150. If a single LED or light source is placed on the side of this structure, the illumination will fall rapidly with distance (e.g., quadratically with the distance). If, instead, strips of LEDs 156A, 156B, or other light sources, are placed along the side surfaces of the structure 150, as shown in FIG. 12, then the illumination will fall more gradually (e.g., between quadratically and linearly with the distance). Thus, using light sources that are extended in one dimension along at least one surface of a structure may improve the uniformity of illumination. FIG. 12 shows an array of multiple LEDs, which approximate a strip light source. Alternately one can use a single COB (chip-on-board) LED, which is manufactured in the shape of a strip (sometimes called an LED "bar"). To minimize the bulk of the device, in some embodiments the light sources may be thin and may be able to be mounted against the side surfaces of the structure 150. Accordingly, SMDs (surface mount devices) including LEDs may be employed which may have a thickness less than 1 mm. In addition, SMD LEDs may provide illumination over a wide range of angles which may further improve uniformity of illumination. Of course, any suitable lighting source may be employed, as the present disclosure is not so limited.

When using an elongated light source, the improvement in uniformity of illumination can make it such that there is no reliance on internal reflection from the top (i.e. interior) surface of the structure 150. In such an embodiment of a retrographic sensor employing an elongated light source, it is possible to use transparent structures that are taller than discussed in reference to other embodiments.

Figure 13:
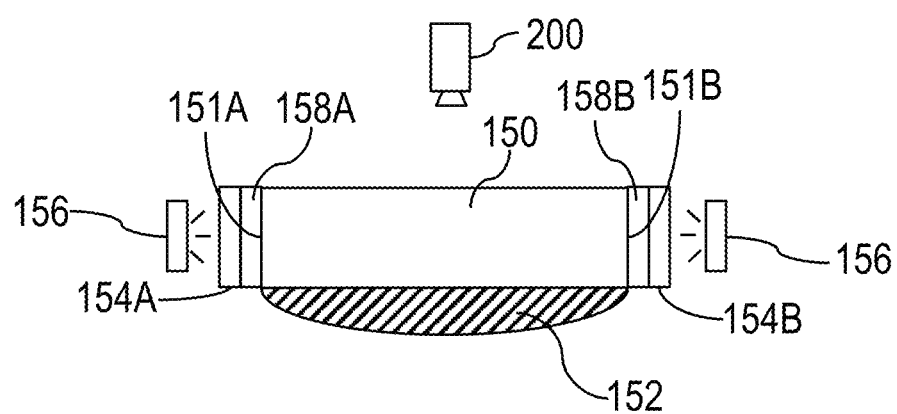
FIG. 13 is a schematic of yet another embodiment of a retrographic sensor.

FIG. 13 is a schematic of yet another embodiment of a retrographic sensor showing a retrographic sensor that combines the principles outlined with reference to the prior embodiments. Imaging device 200 looks through a transparent structure 150 and then through clear elastomer pad 152 toward a matte layer. Thin SMD LEDs, or other light sources 156, illuminate two side surfaces 151A, 151B, with the light passing through diffusers 154A, 154B, and then filters 158A, 158B, on the way to the interior of structure 150. The structure is about 4 times as wide as it is high, and the pad is domed with a radius of about 1.5 times the width of the structure.

The retrographic sensor of FIG. 13 includes a matte layer rather than a semi-specular layer. In some embodiments, the matte layer preferably has a reflectance lower than 30% to reduce the amount of interreflection that can occur within the sensor. In addition, the matte layer preferably has a reflectance greater than 8% in order to provide suitable camera sensitivity. Of course, in other embodiments a matte layer may have a reflectance greater than or less than those noted above, as the present disclosure is not so limited.

Examples of robotic fingers constructed according to exemplary embodiments described herein, their applications, and relevant theory is discussed below.

Example: Shapes for Fingertip Sensors

Consider the task of flipping an object that is resting on a table. In one case, the index finger of a hand rolls an object that is lying on a supporting surface towards the thumb. When using flat sensors, the contact patch location and size greatly vary throughout the manipulation trajectory, with the size of the contact patch being reduced to almost a point contact when it reaches the edge of the sensor. Having such a small contact patch not only reduces the stability of the object, but also reduces the robot's perception of the objects state. On the other hand, when a curved sensor is used, while the location of contact still changes in a similar manner, the contact patch size remains relatively consistent throughout the object trajectory. This decrease in variation of the contact patch size makes it much easier to track the object state.

Another case where fingertip shape clearly impacts the performance of dexterous hand systems is when performing grasp quality assessment. For assessing the quality of a grasp, it is desirable that the contact areas acquired after grasping the object are perceivable by the fingertip sensors. When using flat sensors, in order to maximize the contact patch information, the fingers are reoriented such that the sensing surface is orthogonal to the contact location. As previously stated, this can be problematic when considering the limited kinematic structure of each finger. Since curved fingertips can perceive contact patches in a wider range of orientations, a fingertip may be reoriented to a lesser extent than a flat fingertip.

While in some embodiments a retrographic sensor includes an elastomeric pad including a curved exterior surface corresponding to a curved contact patch with an object, it should be appreciated that a retrographic sensor may include an elastomeric pad having any suitable shape. For example, an elastomeric pad may be flat, curved, beveled or have any other suitable three-dimensional shape, as the present disclosure is not so limited.

Example: Manufacturing

In some embodiments, a retrographic sensor according to exemplary embodiments described herein is manufactured using a series of two-piece molds. That is, various portions of a sensor assembly may be casting into the two-piece molds, and then the at least partially reflective layer may be applied as a coating using an airbrush. However, this process includes methods that also significantly increase the durability and reliability of the sensors compared to conventional retrographic sensors.

In some embodiments, the desired geometry of a transparent shell, as well as the geometry of the silicone and the shell combined, may be three-dimensional printed (e.g., a three-dimensional printer using clear resin). The three-dimensional printed pieces are primed with Krylon Crystal Clear or another suitable material and then the pieces are dipped in a clear UV cure resin and left to drip until a thin layer remains. The resin is cured with a UV lamp. This process is performed multiple times until the print is smooth and optically clear. The reference shell piece is then used to create a two-piece silicone mold. In some cases, Smooth-On MoldMax XLS II may be a suitable mold material because epoxy resin will be cast into these molds later, and this material may be suitably robust for multiple castings compared to other mold materials. The second mold will be used to cast silicone onto the shell, so a two piece mold is created where the base of the mold is a rigid three-dimensional printed piece that will be rigidly attached to the shell, and the other piece is a soft silicone mold made from Smooth-On MoldStar 20T.

In some embodiments, the casting process begins by casting the shell. The shell may be cast with a clear epoxy resin, one example of which is Smooth-On Epoxacast 690. The shell may be approximately 1 mm thick. A material for the shell may be chosen based at least partly on the factors of low-viscosity, clarity, rigidity, and overall ease of use. Of course, any suitable transparent material may be employed for a shell, as the present disclosure is not so limited. After casting the shell, the shell may be left to sit for 24 hours to completely cure. The next stage in the process addresses some of the limitations of conventional retrographic sensors in terms of durability. In particular, in conventional sensors paint applied to the exterior of the sensor may be relatively easy to remove and the gel easily delaminated from an acrylic window. These issues stem from the fact that, (1) it is difficult to get silicone to adhere to anything, and (2) portions of the sensor are mechanically attached rather than chemically. According to the present embodiment, the surface of the shell may be primed with a suitable primer (e.g., Dow DOWSIL P5200). This priming may promote adhesion of the silicone to a variety of surfaces, as the silicone cures on that surface to form a chemical bond, rather than mechanically attaching. Next, the at least partially reflective coating may be created. The coating may be made out of a silicone paint base (e.g., Smooth-on Psycho Paint), and a non-leafing silver dollar aluminum flake pigment. This coating may be sprayed, and according the coating may be diluted with a suitable silicone solvent (e.g., Smooth-On NOVOCS). In some embodiments, a ratio that may be employed is 1:10:30 pigment, silicone paint base, and silicone solvent ratio by mass. The interior of the silicone part of the mold may be sprayed with a releasing agent (e.g., Mann Release Technologies Ease Release 200), and then the opaque coating may be sprayed in with an airbrush. The shell may be screwed onto the mold base, the mold assembled, and optically clear silicone gel (e.g., Silicone Inc. XPS-565 1:15 A:B ratio by mass) may be poured into the mold. The mold may be left out for 6 hours at room temperature and then may be placed in the oven at 95 degrees Celsius.

In some embodiments, an imaging device mount, cover, blinder, and mounting plate may also be three-dimensional printed (e.g., on a Markforged Onyx One printer with the Onyx filament, suitable for creating strong fixtures). In some embodiments, the imaging device may be configured as a camera (e.g., a Frank-S15-V1.0 Raspberry Pi camera sensor) that may be press fitted into the imaging device mount. This camera may have a high field of view (FOV) of 160 degrees which observes a significant area of the sensing surface, while being significantly more compact than previous cameras used in conventional retrographic sensors. The camera holder may be press fitted into the cover and then screwed in with a suitable fastener (e.g., screw). A back LED board (e.g., see led arrays 106A, 106B in FIG. 1B) may be screwed into the cover using another suitable fastener (e.g., screw). The cover may then be press fit into the shell. Two suitable fasteners (e.g., screws) may be inserted into the bottom of the mounting plate that then pass through the through holes of the bottom LED board, blinder, and shell and then screwed into the cover. The back LED board may be soldered to a bottom LED board (e.g., see LED array 104 in FIG. 1B) via four wires. Two power cables were routed to a controller including a processor (e.g., a Raspberry Pi 4) to power the LEDs boards with an appropriate voltage (e.g., 3.3V, 5V, etc.). The camera may also be connected to the controller via a suitable communications cable (e.g., a CSI flat connector cable).

In some embodiments, an image from an imaging device of a retrographic sensor may be streamed via HTTP. For example, an image may be streamed at a resolution of 640×480 with a frame rate of about 90 FPS. In some embodiments, the latency of such a stream may be low (e.g., a delay of about 40 ms). According to such an embodiment, no computing happens may happen on a local processor of the retrographic sensor. In some embodiments, multiple retrographic sensors may be connected to a host computer including a computer processor configured to execute computer readable instructions stored in memory. The computer processor, being capable of executing instructions stored in volatile or non-volatile memory, may process the images from the retrographic sensor.

Example: Experimental Setup for Retrographic Sensor Using Light Piping

To validate the retrographic sensors according to exemplary embodiments described herein experimentally, tests including controlled rolling on a set of unknown objects was performed. The experiment was broken up into three stages. In the first stage an unknown object was placed in between the index finger and the thumb of a hand-like manipulator. While the "thumb" of the manipulator stayed stationary, the index finger moved towards the thumb until contact was made. After contact was made, the index finger continued to move towards the thumb until the desired maximum displacement of the sensing surface was achieved. A controller described later below was used to roll the object until contact was made in a desired region of the finger. A trial was considered a success if the finger was able to roll the object until contact was made within the target contact region. If the object fell out of the grasp at any stage in the trial, overshot the desired contact region, or did not reach the contact area within 3 seconds after the rolling stage of the trial begins, the trial was considered a failure. 10 trials were performed for each object.

To validate the sensors and the sensor geometry, controlled rolling of a set of unknown objects was performed.

In order to do controlled rolling of an unknown object, a tracking method along with a reactive controller was employed to deal with uncertainty in the geometry and dynamics of the object. It was assumed that no slip will occur throughout execution of the trajectory and chose an action according to the changes in geometry of the sensing surface.

In order to achieve three-dimensional reconstruction of the object, it was desirable to provide feedback about the geometry of the sensing surface. Using the tables constructed from the calibration procedure described previously real time three-dimensional reconstruction was performed. At each time step, a difference image was created between the current sensor reading and an image of the sensor without contact to filter out everything in the image except the contact area. The RGB values in the difference image were converted to gradients using look-up tables. This gradient was passed to a fast Poisson solver to get a height map. Once the height map was received each image patch corresponding to each quad was extracted, the image was warped to get rid of the perspective view, and the calculated height added to the corresponding point in the point cloud. The three-dimensional reconstruction ran at 40 hz when the image was downsampled to 320×240 px.

One limitation of the experimental sensor was that only information about the gradient in the x-direction was provided with two sources of information and the gradient in the y-direction with one source of information. This may result in inaccuracies about the heightmap along the y-axis. So, basic thresholding on the depth of the heightmap did not result in an accurate contact patch. To address this issue, the contact area was determined by selecting the points with a subset of points with the largest displacement.

To track the contact area, Iterative Closest Point (ICP) was used. On each time-step, the current contact area was calculated along with its convex hull. The points from the previous contact area were retrieved that lie within the convex hull of the current contact area and ICP was performed to get the change in the contact area. ICP was only performed with the points within the convex hull on each time step while rolling.

A hybrid velocity/force controller was used. This allowed the finger to perform a compliant motion where the finger moved up in task space while maintaining a consistent force normal to the contact patch, resulting in a rolling motion. The maximum displacement of the contact surface was used as a proxy for force in the controller.

The experimental method and sensor were able to successfully perform 99 out of 100 controlled rolls into the desired contact region despite being presented a diverse set of objects with varying smoothness, hardness, and geometries.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:
1. A retrographic sensor comprising:
 a transparent shell including at least a portion having a curved interior surface and a curved exterior surface;
 a transparent elastomeric pad disposed on the curved exterior surface;

an at least partially reflective layer disposed on the transparent elastomeric pad such that the transparent elastomeric pad is disposed between the at least partially reflective layer and the transparent shell; and
one or more light sources configured to emit light into the transparent shell.

2. The retrographic sensor of claim 1, wherein the at least partially reflective layer has a reflectance between 50% and 100%.

3. The retrographic sensor of claim 1, wherein the curved interior surface and the curved exterior surface of the transparent shell are separated by at least one side surface of the transparent shell, wherein the one or more light sources emit light into the at least one side surface.

4. The retrographic sensor of claim 3, wherein the one or more light sources are a plurality of light sources arranged in an elongated array running parallel to the at least one side surface.

5. The retrographic sensor of claim 1, wherein the at least partially reflective layer is a semi-specular layer, and wherein a specular lobe of the semi-specular layer has an angular width between 6 degrees and 40 degrees.

6. The retrographic sensor of claim 1, wherein a combined thickness of the transparent shell and elastomeric pad is between 4% and 20% of a radius of curvature of the curved exterior surface.

7. The retrographic sensor of claim 1, further comprising an imaging device oriented towards the curved interior surface.

8. A retrographic sensor comprising:
a transparent structure;
a transparent elastomeric pad disposed on the transparent structure;
a semi-specular layer disposed on the transparent elastomeric pad such that the transparent elastomeric pad is disposed between the semi-specular layer and the transparent structure, wherein a specular lobe of the semi-specular layer has an angular width between 6 degrees and 40 degrees; and
one or more light sources configured to emit light into the transparent structure.

9. The retrographic sensor of claim 8, wherein the transparent structure is configured as a shell including at least a portion having a curved interior surface and a curved exterior surface, wherein the transparent elastomeric pad is disposed on the curved exterior surface.

10. The retrographic sensor of claim 9, wherein a combined thickness of the transparent structure and the transparent elastomeric pad is between 4% and 20% of a radius of curvature of the curved exterior surface of the transparent structure.

11. The retrographic sensor of claim 8, wherein the one or more light sources emit at least two different wavelengths of light in different positions along the transparent structure.

12. The retrographic sensor of claim 8, wherein the semi-specular layer has a reflectance between 50% and 100%.

13. The retrographic sensor of claim 8, wherein the transparent structure includes an interior surface and an exterior surface, wherein the interior surface and the exterior surface of the transparent structure are separated by at least one side surface of the transparent structure, wherein the one or more light sources emit light into the at least one side surface.

14. The retrographic sensor of claim 13, wherein the one or more light sources include a plurality of light sources arranged in an elongated array running parallel to the at least one side surface.

15. The retrographic sensor of claim 8, further comprising an imaging device oriented towards an interior surface of the transparent structure.

16. The retrographic sensor of claim 8, wherein the light is transported through the transparent structure and the transparent elastomeric pad by a light piping effect with multiple reflections.

17. A retrographic sensor comprising:
a transparent structure;
a transparent elastomeric pad disposed on the transparent structure;
a matte layer disposed on the transparent elastomeric pad such that the transparent elastomeric pad is disposed between the matte layer and the transparent structure;
one or more light sources configured to emit light into the transparent structure; and
a filter positioned between the one or more light sources and the transparent structure.

18. The retrographic sensor of claim 17, wherein the filter absorbs at least 50% of the light from the one or more light sources.

19. The retrographic sensor of claim 18, further comprising an imaging device oriented towards an interior surface of the transparent structure.

20. The retrographic sensor of claim 17, wherein the filter is in optical contact with the transparent structure.

21. The retrographic sensor of claim 20, further comprising a diffuser, wherein the diffuser is positioned between the one or more light sources and the transparent structure.

22. The retrographic sensor of claim 21, wherein the diffuser is positioned between the one or more light sources and the filter, and wherein the diffuser is placed in optical contact with the filter.

23. The retrographic sensor of claim 17, wherein the one or more light sources include LEDs configured in one or more elongated arrays.

24. The retrographic sensor of claim 23, wherein the one or more elongated arrays have a width at least three times larger than a height of the one or more elongated arrays.

25. The retrographic sensor of claim 17, wherein the transparent elastomeric pad is domed, and wherein the transparent elastomeric pad has a radius between 0.75 times and 4 times a width of the transparent structure.

26. The retrographic sensor of claim 17, wherein the one or more light sources includes a first light source positioned on a first side of the transparent structure and a second light source positioned on a second side of the transparent structure, wherein the first light source and the second light source emit different wavelengths of light.

27. The retrographic sensor of claim 17, wherein a distance between the transparent elastomeric pad and the one or more light sources is less than or equal to two times a thickness of the transparent elastomeric pad.

28. A retrographic sensor comprising:
a transparent structure including an interior surface and an exterior surface;
a transparent elastomeric pad disposed on the exterior surface of the transparent structure;
an at least partially reflective layer disposed on the transparent elastomeric pad such that the transparent elastomeric pad is disposed between the at least partially reflective layer and the transparent structure, wherein the at least partially reflective layer is a semi-specular layer, and wherein a specular lobe of the semi-specular layer has an angular width between 6 degrees and 40 degrees; and one or more light sources configured to emit light into the transparent structure, wherein light from the one or more light sources is configured to be repeatedly reflected between the at least partially reflective layer and the interior surface.

29. The retrographic sensor of claim 28, wherein a width of the transparent structure is more than six times a thickness of the transparent structure.

30. The retrographic sensor of claim 28, wherein the interior surface is a curved interior surface, and wherein the exterior surface is a curved exterior surface.

31. The retrographic sensor of claim 28, wherein the one or more light sources include LEDs configured in one or more elongated arrays.

32. The retrographic sensor of claim 31, wherein the one or more elongated arrays have a width at least three times larger than a height of the one or more elongated arrays.

33. The retrographic sensor of claim 28, wherein the one or more light sources includes a first light source positioned on a first side of the transparent structure and a second light source positioned on a second side of the transparent structure, wherein the first light source and the second light source emit different wavelengths of light.

* * * * *